(12) United States Patent
Manoharan et al.

(10) Patent No.: US 11,328,020 B2
(45) Date of Patent: May 10, 2022

(54) DISCOVERABILITY IN SEARCH

(71) Applicant: Roblox Corporation, San Mateo, CA (US)

(72) Inventors: Aswath Manoharan, Sunnyvale, CA (US); Nikolaus Sonntag, Foster City, CA (US); Shailendra Rathore, San Ramon, CA (US)

(73) Assignee: Roblox Corporation, San Mateo, CA (US)

( * ) Notice: Subject to any disclaimer, the term of this patent is extended or adjusted under 35 U.S.C. 154(b) by 176 days.

(21) Appl. No.: 16/400,413

(22) Filed: May 1, 2019

(65) Prior Publication Data

US 2020/0349201 A1    Nov. 5, 2020

(51) Int. Cl.
*G06F 16/903*  (2019.01)
*G06F 16/9538*  (2019.01)
*G06F 7/72*  (2006.01)
*G06F 16/9535*  (2019.01)

(52) U.S. Cl.
CPC ......... *G06F 16/90335* (2019.01); *G06F 7/72* (2013.01); *G06F 16/9535* (2019.01); *G06F 16/9538* (2019.01)

(58) Field of Classification Search
None
See application file for complete search history.

(56) References Cited

U.S. PATENT DOCUMENTS

| 2012/0016906 | A1 | 1/2012 | Tang et al. |
| 2012/0149470 | A1 | 6/2012 | Dasdan et al. |
| 2012/0221566 | A1 | 8/2012 | Iwasa |
| 2014/0172830 | A1* | 6/2014 | Yoshino ............ G06F 16/90335 707/722 |
| 2015/0120689 | A1 | 4/2015 | Miao et al. |
| 2016/0371388 | A1 | 12/2016 | Ahrens et al. |
| 2018/0096027 | A1* | 4/2018 | Romero ............ G06F 16/9535 |

OTHER PUBLICATIONS

"International Search Report and Written Opinion in PCT/US2019/052807", 12 pages.
IB, International Preliminary Report on Patentability for International Patent Application No. PCT/US2019/052807, dated Nov. 2, 2021, 10 pages.

* cited by examiner

*Primary Examiner* — Amresh Singh
(74) *Attorney, Agent, or Firm* — IP Spring

(57) ABSTRACT

A method and system is disclosed that provides search with improved discoverability within an online gaming platform.

20 Claims, 6 Drawing Sheets

DISCOVERABILITY IN SEARCH

FIELD

This disclosure relates to the field of computerized data searching and, in particular, to methods, systems, and computer readable media for searching with improved discoverability in online gaming platform data.

BACKGROUND

Some online gaming platforms, allow users to create content, connect with each other, interact with each other (e.g., within a game) and share information with each other via the Internet. Users of online gaming platforms may participate in multiplayer gaming environments in which games or parts of games have been created by other users.

When users search through user generated content (e.g., games, items for games, etc.) or other content, a search engine may return results based on historical data such as popularity in terms of numbers of downloads, rating by users, etc. However, such search engines may overlook or not emphasize newer content because such content may not have the historical data that older content may have. Thus, newer content may not be discovered as readily as older content. Accordingly, there may exist a need for improved discoverability of newer content within a content (e.g., user generated content, etc.) search engine of an online gaming platform (or other system).

Some implementations were conceived in light of the above-mentioned needs, among other things.

SUMMARY

Some implementations improve discoverability of newly added content in searches performed by users.

Some implementations can include a method. The method can include receiving, at a server, a search query from a device, and selecting a search criterion from among a first criterion and a second criterion. The method can also include executing the search query against a data store using the search criterion, and receiving search results from the data store in response to executing the search query. The method can further include transmitting at least a portion of the search results and a state indication corresponding to the search criterion to the device.

The method can also include receiving a request for additional results from the search results, wherein the request includes an indication of the additional results requested and the state indication, and providing additional search results according to the state indication. In some implementations, the data store includes one or more games and information associated with each game, wherein the information associated with each game includes one or more of game title, game type, game developer name, game first availability time, game most recent version availability time, or game popularity, and wherein executing the search query against a data store using the search criterion includes matching the search criterion against the information associated with each game.

In some implementations, the search criterion is the first criterion and the search results comprise search results ranked by respective popularity of each search result. In some implementations, the search criterion is the second criterion, the method further comprising ranking the search results based on a recency associated with each item that matches the search query.

In some implementations, the search results can be determined based on the search query irrespective of the search criterion, and wherein the search criterion is used to determine an ordering of the search results. In some implementations, the search query can include a plurality of terms, and wherein selecting the search criterion is performed on a per search term basis, independent of search criterion selection made for other search terms.

The method can also include calculating a modulo result of a hash of one or more search terms in the search query added with a random value, and comparing the modulo result to a search criterion selection threshold. The method can further include, if the modulo result exceeds the search criterion selection threshold, selecting the first criterion, and, if the modulo result does not exceed the search criterion selection threshold, selecting the second criterion.

Some implementations can include a nontransitory computer-readable medium having stored thereon software instructions that, when executed by a processor of a client device, cause the processor to perform operations. The operations can include receiving a search query, and selecting a search criterion from among a first criterion and a second criterion. The operations can also include transmitting the search query and the search criterion, and receiving search results from a data store in response to execution of the search query. The operations can further include storing a state indication corresponding to the search criterion.

The operations can also include receiving a request for additional results from the search results, wherein the request includes an indication of the additional results requested and the state indication, and providing additional search results according to the state indication.

In some implementations, the data store includes one or more games and information associated with each game, wherein the information associated with each game includes one or more of game title, game type, game developer name, game first availability time, game most recent version availability time, or game popularity, and wherein executing the search query against a data store using the search criterion includes matching the search criterion against the information associated with each game. In some implementations, search criterion selection is based on a configurable threshold. In some implementations, search criterion selection is based on a threshold that is configurable independently for one or more specific search terms.

In some implementations, the search criterion is the second criterion and the search results comprise search results ranked based on a recency associated with each item that corresponds to respective search results. In some implementations, the search results can be determined based on the search query irrespective of the search criterion, and wherein the search criterion is used to determine an ordering of the search results.

In some implementations, selecting the search criterion is based on evaluating a modulo result of a hash of one or more search terms keywords summed with a random value, where the evaluating includes comparing the modulo result to a search criterion selection threshold resulting in a first proportion of search being performed using the first criterion and a remaining proportion of searches being performed using the second criterion.

Some implementations can include a system comprising one or more processors coupled to a nontransitory computer readable medium having stored thereon software instructions that, when executed by the one or more processors, cause the one or more processors to perform operations. The operations can include receiving a search query at a server, and selecting a search criterion from among a first criterion and a second criterion, wherein selecting the search criterion is based on evaluating a modulo result, and wherein the evaluating includes comparing the modulo result to a search criterion selection threshold resulting in a first proportion of search being performed using the first criterion and a remaining proportion of searches being performed using the second criterion. The operations can also include executing the search query against a data store using the search criterion, and receiving search results from the data store in response to executing the search query. The operations can further include transmitting a portion of the search results to a device from which the search query was received, and transmitting a state indication corresponding to the search criterion to the device from which the search query was received.

The operations can also include receiving a request for additional results from the search results, wherein the request includes an indication of the additional results requested and the state indication, and providing additional search results according to the state indication.

In some implementations, the first criterion directs a search engine to return search results ranked by respective popularity of each query result. In some implementations, the second criterion directs a search engine to return search results ranked based on a recency associated with each item that corresponds to respective search results.

BRIEF DESCRIPTION OF THE DRAWINGS

Various implementations of the disclosure will be understood more fully from the detailed description given below and from the accompanying drawings of various implementations of the disclosure.

DETAILED DESCRIPTION

Online gaming platforms (also referred to as "user-generated content platforms" or "user-generated content systems") offer a variety of ways for users to interact with one another. For example, users of an online gaming platform may create games or other content or resources (e.g., characters, graphics, items for game play within a virtual world, etc.) within an online gaming platform. Users of an online gaming platform may also search for games or other content.

Users of an online gaming platform may work together towards a common goal, share various virtual gaming items, send electronic messages to one another, and so forth. Users of an online gaming platform may play games using characters. An online gaming platform may also allow users of the platform to communicate with each other. For example, users of the online gaming platform may communicate with each other using voice messages (e.g., via voice "chat"), text messaging, video messaging, or a combination of the above. Online gaming platforms can provide a virtual three-dimensional environment in which users can play an online game. In order to help enhance the entertainment value of an online game, the online gaming platform can provide a search engine for games, game content, or other game related resources, where the search engine provides improved discoverability of recently added games, content or resources.

Figure 1:
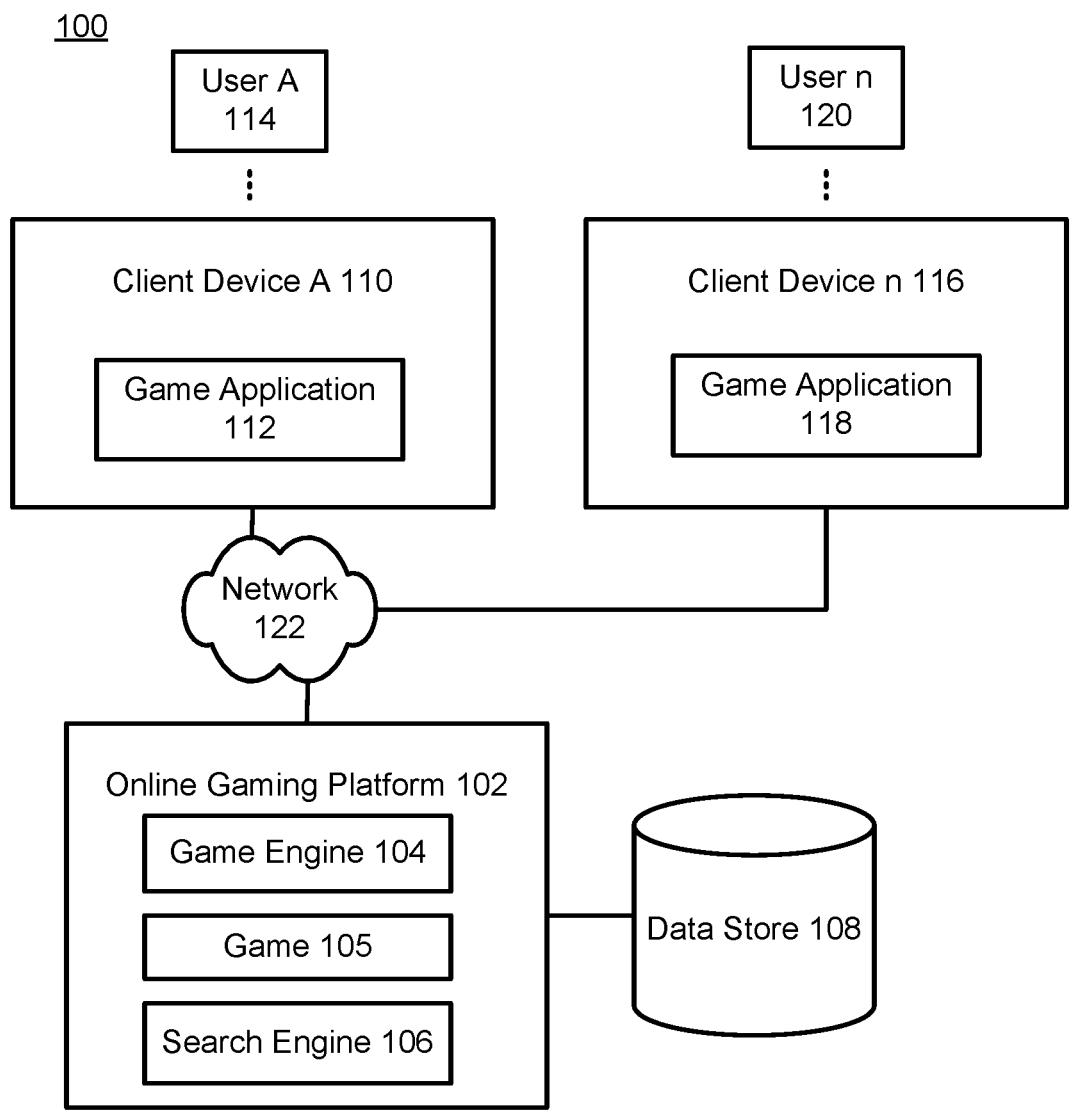
FIG. 1 is a diagram of an example environment for search with improved discoverability in accordance with some implementations.

FIG. 1 illustrates an example system architecture 100, in accordance with some implementations of the disclosure. The system architecture 100 (also referred to as "system" herein) includes an online gaming platform 102, a first client device 110 (generally referred to as "client devices 110/116" herein), a network 122, and a second client device 116. The online gaming platform 102 can include, among other things, a game engine 104, one or more games 105, a search engine 106, and a data store 108. The client device 110 can include a game application 112. The client system 116 can include a game application 118. Users 114 and 120 can use client devices 110 and 116, respectively, to interact with the online gaming platform 102.

System architecture 100 is provided for illustration, rather than limitation. In some implementations, the system architecture 100 may include the same, fewer, more, or different elements configured in the same or different manner as that shown in FIG. 1.

In one implementation, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., a webpage) or application back-end software that may be used to provide a user with access to content provided by online gaming platform 102. For example, users may access online gaming platform 102 using the game application 112/118 on client devices 110/116, respectively.

In some implementations, online gaming platform 102 may be a type of social network providing connections between users or a type of user-generated content system that allows users (e.g., end-users or consumers) to communicate with other users on the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 102 may be a virtual gaming platform. For example, the gaming platform may provide single-player or multiplayer games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and participate in gameplay with other users in one or more games selected from results of the search. In some implementations, a game selected from results of the search may be played in real-time with other users of the game.

In some implementations, gameplay may refer to interaction of one or more players using client devices (e.g., 110 and/or 116) within a game (e.g., 105) or the presentation of the interaction on a display or other output device (e.g., 118/132) of a client device 110 or 1116.

In some implementations, a game 105 can include an electronic file that can be executed or loaded using software, firmware or hardware configured to present the game content (e.g., digital media item) to an entity. In some implementations, a game application 112/118 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming platform 102 can host one or more games 105 and can permit users to interact with the games 105 (e.g., search for games, game-related content, or other content) using a game application 112/118 of client devices 110/116. Users (e.g., 114 and/or 120) of the online gaming platform 102 may play, create, interact with, or build games 105, search for games 105, communicate with other users, create and build objects (e.g., also referred to as "item(s)" or "game objects" or "virtual game item(s)" herein) of games 105, and/or search for objects. For example, in generating user-generated virtual items, users may create characters, decoration for the characters, one or more virtual environments for an interactive game, or build structures used in a game 105, among others. In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications. In some implementations, game objects (e.g., also referred to as "item(s)" or "objects" or "virtual game item (s)" herein) may refer to objects that are used, created, shared or otherwise depicted in game applications 105 of the online gaming platform 102 or game applications 112 or 118 of the client devices 110/116. For example, game objects may include a part, model, character, tools, weapons, clothing, buildings, vehicles, currency, flora, fauna, components of the aforementioned (e.g., windows of a building), and so forth.

It may be noted that the online gaming platform 102 hosting games 105, is provided for purposes of illustration, rather than limitation. In some implementations, online gaming platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associated the specific user(s) with a game 105 using user account information (e.g., a user account identifier such as username and password).

In some implementations, online gaming platform 102 or client devices 110/116 may include a game engine 104 or game application 112/118. The game engine 104 can include a game application similar to game application 112/118. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112/118 of client devices 110/116, respectively, may work independently, in collaboration with game engine 104 of online gaming platform 102, or a combination of both.

In some implementations, both the online gaming platform 102 and client devices 110/116 execute a game engine (104, 112, and 118, respectively). The online gaming platform 102 using game engine 104 may perform some or all the game engine functions (e.g., generate physics commands, rendering commands, etc.), or offload some or all the game engine functions to game engine 104 of client device 110. In some implementations, each game 105 may have a different ratio between the game engine functions that are performed on the online gaming platform 102 and the game engine functions that are performed on the client devices 110 and 116. For example, the game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a particular game 105 exceeds a threshold number, the online gaming platform 102 may perform one or more game engine functions that were previously performed by the client devices 110 or 116.

For example, users may be playing a game 105 on client devices 110 and 116, and may send control instructions (e.g., user inputs, such as right, left, up, down, user election, or character position and velocity information, etc.) to the online gaming platform 102. Subsequent to receiving control instructions from the client devices 110 and 116, the online gaming platform 102 may send gameplay instructions (e.g., position and velocity information of the characters participating in the group gameplay or commands, such as rendering commands, collision commands, etc.) to the client devices 110 and 116 based on control instructions. For instance, the online gaming platform 102 may perform one or more logical operations (e.g., using game engine 104) on the control instructions to generate gameplay instruction for the client devices 110 and 116. In other instances, online gaming platform 102 may pass one or more or the control instructions from one client device 110 to other client devices (e.g., 116) participating in the game 105. The client devices 110 and 116 may use the gameplay instructions and render the gameplay for presentation on the displays of client devices 110 and 116.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 102. In other implementations, the control instructions may be sent from a client device 110 to another client device (e.g., 116), where the other client device generates gameplay instructions using the local game engine 104. The control instructions may include instructions to play a voice communication message or other sounds from another user on an audio device (e.g., speakers, headphones, etc.

In some implementations, gameplay instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 108. In some implementations, the online gaming platform 102 maintains a character catalog and game catalog that may be presented to users via. In some implementations, the game catalog includes images of games stored on the online gaming platform 102. In addition, a user may select a character (e.g., a character created by the user or other user) from the character catalog to participate in the chosen game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online gaming platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online gaming platform 102, such as search for a game or other content, control a virtual character in a virtual game hosted by online gaming platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 or 116 and allows users to interact with online gaming platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 112/118 may be an online gaming platform application for users to build, create, edit, upload content to the online gaming platform 102 as well as interact with online gaming platform 102 (e.g., play games 105 hosted by online gaming platform 102). As such, the game application 112/118 may be provided to the client device 110 or 116 by the online gaming platform 102. In another example, the game application 112/118 may be an application that is downloaded from a server.

In some implementations, a user may login to online gaming platform 102 via the game application. The user may access a user account by providing user account information (e.g., username and password) where the user account is associated with one or more characters available to participate in one or more games 105 of online gaming platform 102.

In general, functions described in one implementation as being performed by the online gaming platform 102 can also be performed by the client device(s) 110 or 116, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include a search engine 106. In some implementations, the search engine 106 may be a system, application, or module that permits the online gaming platform 102 to provide search functionality to users, where the search functionality permits the users to search for games, game-related content or other content within the online gaming platform 102. In some implementations, the search engine 106 may perform one or more of the operations described below in connection with the flowcharts shown in FIGS. 2 and 3.

Figure 2:
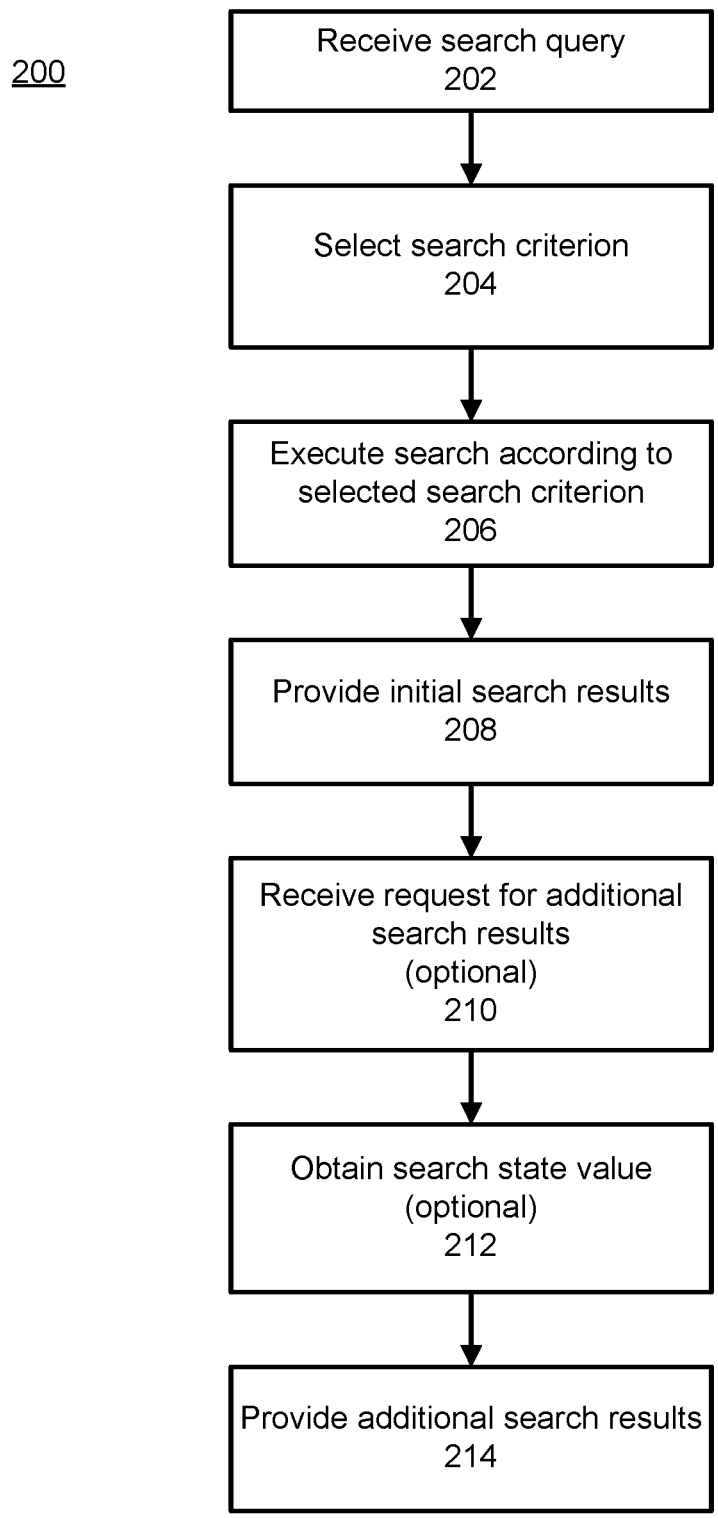
FIG. 2 is a flowchart of an example method of search with improved discoverability in accordance with some implementations.

FIG. 2 is a flowchart of an example method 200 of search with improved discoverability in accordance with some implementations. Processing begins at 202, where a search query is received at a server. For example, a user (e.g., 114) could enter a search query into a game application 112 executing on a client device 110, which send the search query to a server (e.g., 102) resulting in receiving the search query at the server. The search query can include one or more terms or keywords that a user is searching for in a game or game-related content within an online gaming platform (e.g., 102) or other system. Processing continues to 204.

At 204, a search criterion is selected from among a first criterion and a second criterion. For example, the first criterion could include historical data associated with a game or game-related content (e.g., number of downloads, user rating, number of times played, etc.) and the second criterion can include recency (e.g., how recently a game or game-related content was uploaded to the online gaming platform). Historical data can include data such as how many times a user searched on a keyword (e.g., "Tycoon") and clicked on game result (e.g., game "A"). While two criteria are described herein for illustration purposes, more than two criteria could be used and selected from.

Selecting between the first criterion and the second criterion can include determining a value based on the search query (e.g., one or more terms or keywords) and/or a numerical function such that the first criterion is selected for a particular proportion of queries (e.g., 90 percent) and the second criterion is selected for the remaining proportion of queries (e.g., the remaining 10 percent). The proportions allocated to the first criterion and second criterion can be adjusted either manually or automatically. Automatic adjustment of the proportions allocated to the different search criteria can be based on user response to the search results that are presented (e.g., rate that users are selecting from among the search results), or other factors. Also, the proportions allocated to the difference search criteria may be adjusted based on online gaming platform user load, time of day, day of week, date, etc. Also, the proportions allocated to the difference search criteria may be adjusted periodically (e.g., adjusted so as to introduce greater discoverability on a periodic basis, such as every other day or once a week, and for a given period of time, such as an hour or a day, etc.). Details of selecting between the first criterion and second criterion are described in greater detail below in connection with FIG. 3. Processing continues to 206.

At 206, the search query is executed against a data store using the search criterion. For example, the search query is search for within the data store (e.g. 108) using the selected search criterion (e.g., first criterion or second criterion selected at 204). Where the data store contains user generated content such as games and game-related content (e.g., avatars, objects, etc. for use in games), and non-user generated content such as games and game related content. The data store can also contain content or information associated with a game such as one or more of game title, game type, game developer name, game first availability time, game most recent version availability time, or game popularity. The data store can index items by keyword, recency timestamp, or other field. The query processing can include (a) when first criterion has been selected, matching based on keywords and returning the best matches ordered by popularity; or (b) when the second criterion is selected, matching based on keywords and ordering the search results in a recent first order. In some implementations, the threshold can be manually adjusted.

For example, if the historical search result ordering is considered the major criteria used most often to display search results to users, and the recency criterion is considered the minor criterion and used less often to show search results, the threshold can be defined based on an extent to which the minor search criteria influence the major search criteria. For example, if it is very important that recent games be quickly included in the historical criteria, then the threshold should be increased so that more recent games appear in the search results more often.

In another example, if the search criterion is the first criterion, the search results can comprise search results ranked by respective popularity of each query result. In another example, if the search criterion is the second criterion, the search results can comprise results ranked based on a recency associated with each item that corresponds to respective search results. In some implementations, ranking based on the recency associated with each item that corresponds to respective search results can include ranking newest items added first.

In addition to the search query and the search criterion, other search parameters may be used to perform the search, such as parameters received with the search query. Parameters can include selections made by a user when the search is being requested (e.g., type of content to search for, include user generated or non-user generated content in the results, and/or other parameters suitable to help narrow the range of results returned from the search). The parameters may be associated with a graphical user interface provided as a search interface. Processing continues to 208.

At 208, initial search results are provided to a device from which the search query was received. For example, one or more search results can be received from the data store in response to executing the search query, and an initial portion of the search results can be transmitted to the device from which the search query was received. In addition to the search results, a state indication corresponding to the search criterion can be transmitted to the device from which the search query was received. Details about the state indication are discussed below in connection with FIG. 3. Processing continues to 210.

At 210, optionally, a request for additional results from the search results is received. For example, a request for a second page or group of search results can be received. Processing continues to 212.

At 212, optionally, the search state value is obtained. For example, the request for additional search results received at 210 can include the state indication. Alternatively, the state indication can be retrieved from a data store coupled to the server. The state indication can include the state criterion used for the search such that when retrieving additional results, the search engine can perform the same type of query so the user experiences consistent results (e.g., historical data based or recency based). Processing continues to 214.

At 214, additional search results are provided. For example, a subsequent page or group of search results can be generated based on the search query and the search state indication. The subsequent page or group of additional search results can then be transmitted to the device from which the search query was received. As additional results are requested by a user, 210-214 can be repeated.

Steps 202-214 can be performed (or repeated) in a different order than described above and/or one or more steps can be omitted.

Figure 3:
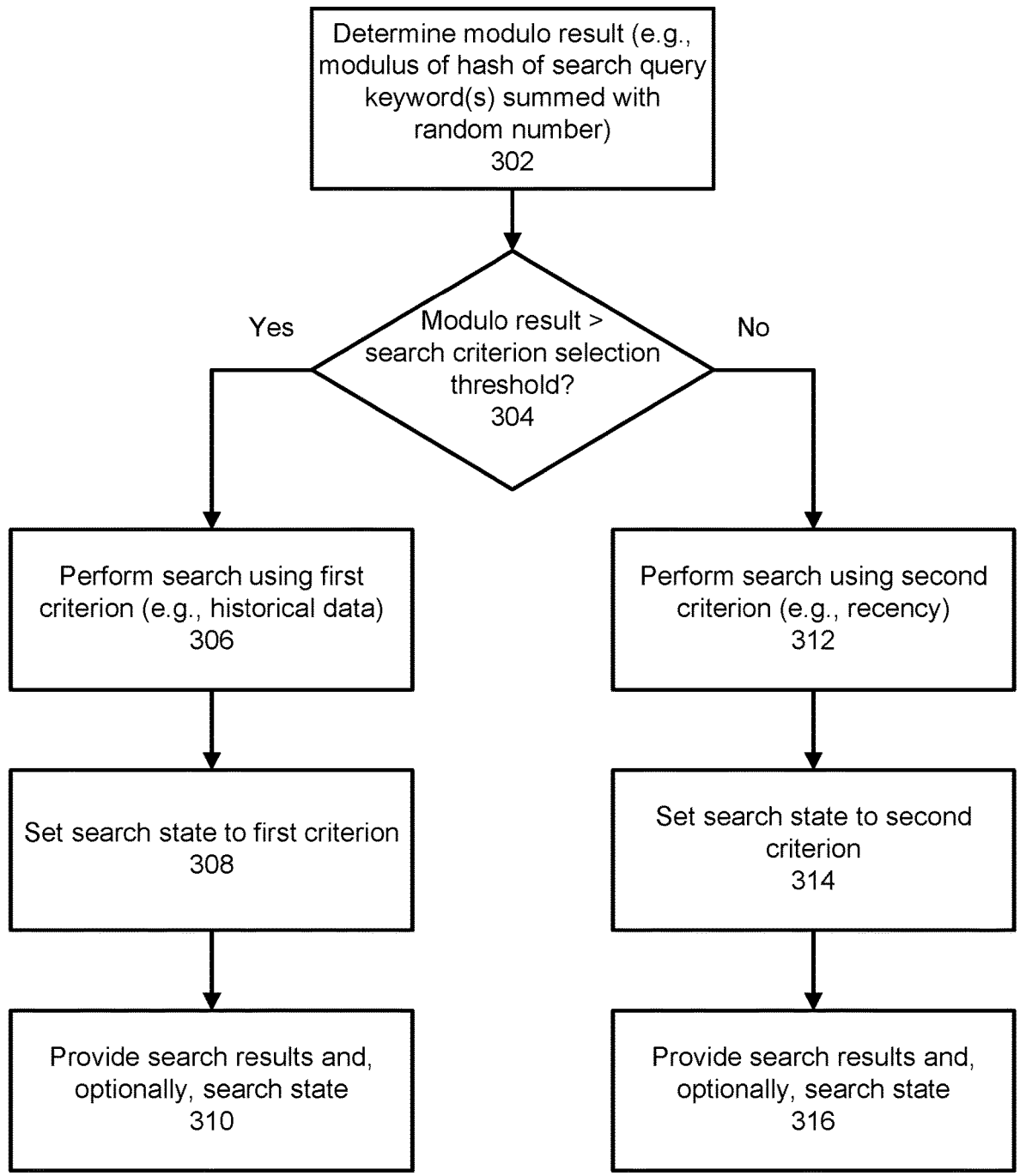
FIG. 3 is a flowchart of an example method of search with improved discoverability in accordance with some implementations.

FIG. 3 is a flowchart of an example method 300 of search with improved discoverability in accordance with some implementations. Processing begins at 302, where a modulo result (or other value used for logic decision purposes) is determined. For example, in some implementations, the modulo result can include the modulo result of a hash of one or more search term keywords summed with a random value, as shown by the example formula: modulo result= (keyword hash+random number (1 to 100)) mod 100. Other formulas or techniques can be used that achieve a suitable result of dividing the search functions as described below in 304.

At 304, the modulo result determined in 302 is evaluated. The evaluating includes comparing the modulo result to a search criterion selection threshold resulting in a first proportion of searches being performed using the first criterion and a remaining proportion of searches being performed using the second criterion. For example, if a given implementation seeks to have 90 percent of searches performed using the first criterion and 10 percent performed using the second criterion, the search criterion selection threshold can be set to 10 such that if the modulo result is greater than 10, then the first criterion search is performed and if the modulo result is equal to 10 or less, then the second criterion search is performed. The search criterion selection threshold can be adjustable (e.g., manually or automatically, as discussed above) to provide for different percentages of search queries being performed using respective criteria.

By providing the two search criteria, one based on historical data and one based on recency, an implementation can provide reliable search results that users expect on most of the queries (e.g. 90 percent of the queries), while also improving discoverability of recency based results the remaining percent of queries (e.g., 10 percent). Such an approach can permit newer content (e.g., games or game related content) an opportunity to be discovered by appearing at a higher rank in the search results than the newer content would typically appear in a historical data based search approach.

The search criterion selection threshold can be a single value applied to all search terms or keywords, or can be configured to be a separate value for certain keywords or terms and a catch-all value for any search terms or keywords that are not associated with a separate value. Thus, the search criterion selection value can be configured individually for specific keywords or terms. For example, in some implementations, the modulo result determination and evaluation is performed independently for each search term entered (i.e., no previous state or other information need be stored for each search term in order to select the search criterion). However, in some implementations, a separate threshold can be used for certain search terms such that the modulo result is evaluated for a given search term based on the threshold value for that search term. In other implementations, a single threshold can be used to evaluate the modulo result for all search terms. In still other implementations, a combination of separate thresholds and a global threshold can be used such that separate thresholds are used for certain search terms and the global threshold is used for the reminder of search terms entered.

If the modulo result is greater than the search criterion selection threshold, processing continues to 306, otherwise processing continues to 312.

At 306, the search is performed using the first criterion (e.g., based on historical data), as discussed above. Processing continues to 308.

At 308, a search state variable is set to indicate the search was performed with the first criterion. The search state can be preserved on the server side or sent to the client device. For example, the search state can be maintained at the client device using javascript or other suitable state preserving techniques. Processing continues to 310.

At 310, the search results and/or search state are provided to the client device that requested the search.

At 312, the search is performed using the second criterion (e.g., recency), as discussed above. Processing continues to 314.

At 314, a search state variable is set to indicate the search was performed with the second criterion. The search state can be preserved on the server side or sent to the client device. For example, the search state can be maintained at the client device using javascript or other suitable state preserving techniques. Processing continues to 316.

At 316, the search results and/or search state are provided to the client device that requested the search.

Steps 302-316 can be performed (or repeated) in a different order than described above and/or one or more steps can be omitted.

Methods 200 and/or 300 can be performed on a sever (e.g., 102) and/or a client device (e.g., 110 or 116).

Implementations of the disclosed search with improved discoverability can improve user experience by making new content visible to users in the presence of strong historical data associated with other content. In some implementations, newer content can be discovered more quickly when the search engine provides for a portion of searches to be based on recency (or other criteria different than historical data such as popularity, number of players, etc.). Some implementations can provide state preservation at client and/or server, which provides for consistency between page 1 of the search results and subsequent pages of the search results that are loaded later. Also, some implementations can reduce "server load" on popular or high ranking games by suggesting other games, for example newer games, instead. In some implementations, game load (e.g., the number of users playing or downloading a game) can be used a criteria to adjust the threshold for selecting between the first and second search approaches.

In some implementations, the recency criterion may not be limited to recency specifically, but may include one or more other factors that may provide quality results that are recent or represent recency using different parameters. For example, favorites count along with search relevance of game documents can be used as criteria that allow for recently created games to surface. For example, the system may sort the search results based on a combined score of favorites (e.g., number of times game has been added to favorites of a user or number of times game has been added to favorites within a given time period) and search relevance of each game. Similarly, recency (e.g., how long ago a game or other content was uploaded) could be combined with scores/counts of other parameters (number favorites, number of downloads, player rating, etc.) to help ensure quality content is returned first. Parameters, scores or counts being evaluated could include total values or values over a given time period (e.g., last hour, last day, etc.).

In some implementations, the selecting of the search criterion is performed on a per search term basis (e.g., done independently as each search query is received) and is independent of search criterion selection made for other search terms. Thus, some implementations are able to provide searches with different criteria without having to count searches or maintain data about the searches on a server.

Figure 4:
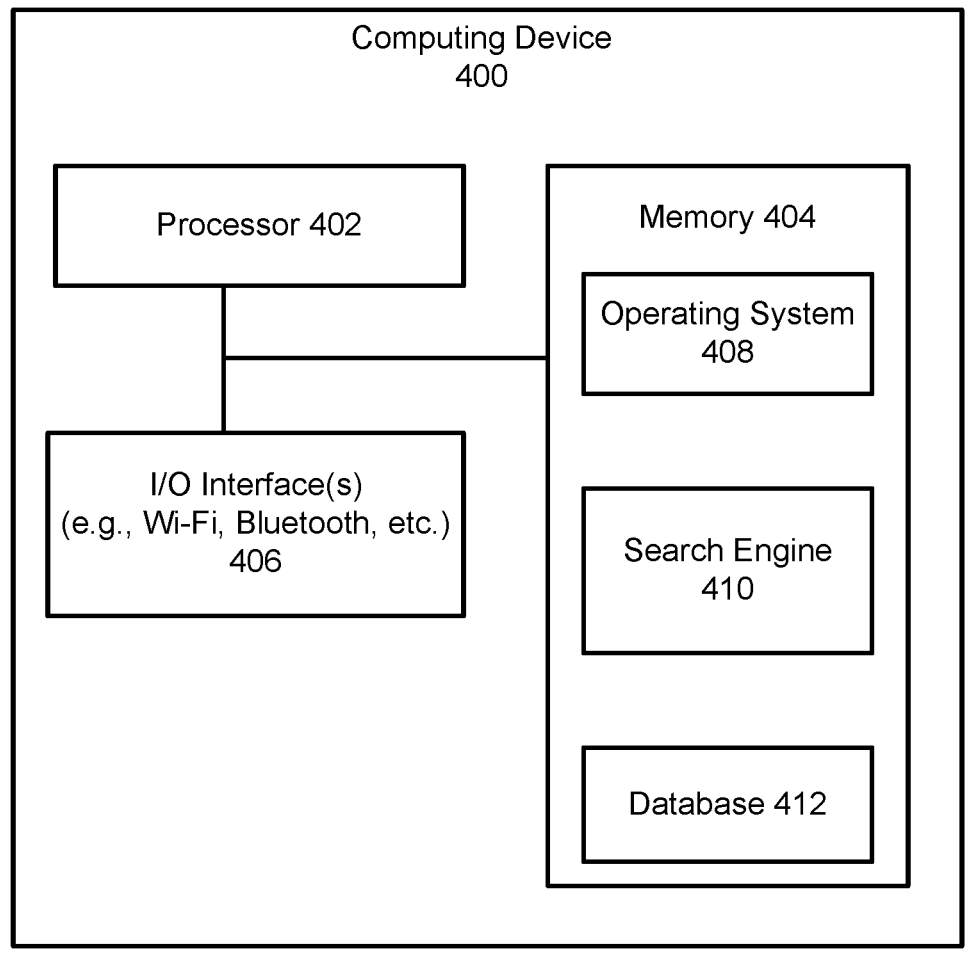
FIG. 4 is a block diagram illustrating an exemplary computing device in accordance with some implementations.

FIG. 4 is a block diagram of an example computing device 400 which may be used to implement one or more features described herein. In one example, device 400 may be used to implement a computer device, (e.g., 102, 110, and/or 116 of FIG. 1), and perform appropriate method implementations described herein. Computing device 400 can be any suitable computer system, server, or other electronic or hardware device. For example, the computing device 400 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 400 includes a processor 402, a memory 404, input/output (I/O) interface 406, and audio/video input/output devices 414.

Processor 402 can be one or more processors and/or processing circuits to execute program code and control basic operations of the device 400. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 608, a search engine application 410 and associated data 412. In some implementations, the search engine application 410 can include instructions that enable processor 402 to perform the functions described herein, e.g., some or all of the methods of FIGS. 2 and 3.

For example, memory 404 can include software instructions for a search engine 410 that can provide search with improved discoverability within an online gaming platform (e.g., 102). Any of software in memory 404 can alternatively be stored on any other suitable storage location or computer-readable medium. In addition, memory 404 (and/or other connected storage device(s)) can store instructions and data used in the features described herein. Memory 404 and any other type of storage (magnetic disk, optical disk, magnetic tape, or other tangible media) can be considered "storage" or "storage devices."

I/O interface 406 can provide functions to enable interfacing the server device 400 with other systems and devices. For example, network communication devices, storage devices (e.g., memory and/or data store 108), and input/output devices can communicate via interface 406. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 4 shows one block for each of processor 402, memory 404, I/O interface 406, software blocks 408 and 410, and database 412. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While the online gaming platform 102 is described as performing operations as described in some implementations herein, any suitable component or combination of components of online gaming platform 102 or similar system, or any suitable processor or processors associated with such a system, may perform the operations described.

A user device can also implement and/or be used with features described herein. Example user devices can be computer devices including some similar components as the device 400, e.g., processor(s) 402, memory 404, and I/O interface 406. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 414, for example, can be connected to (or included in) the device 400 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

Figure 5:
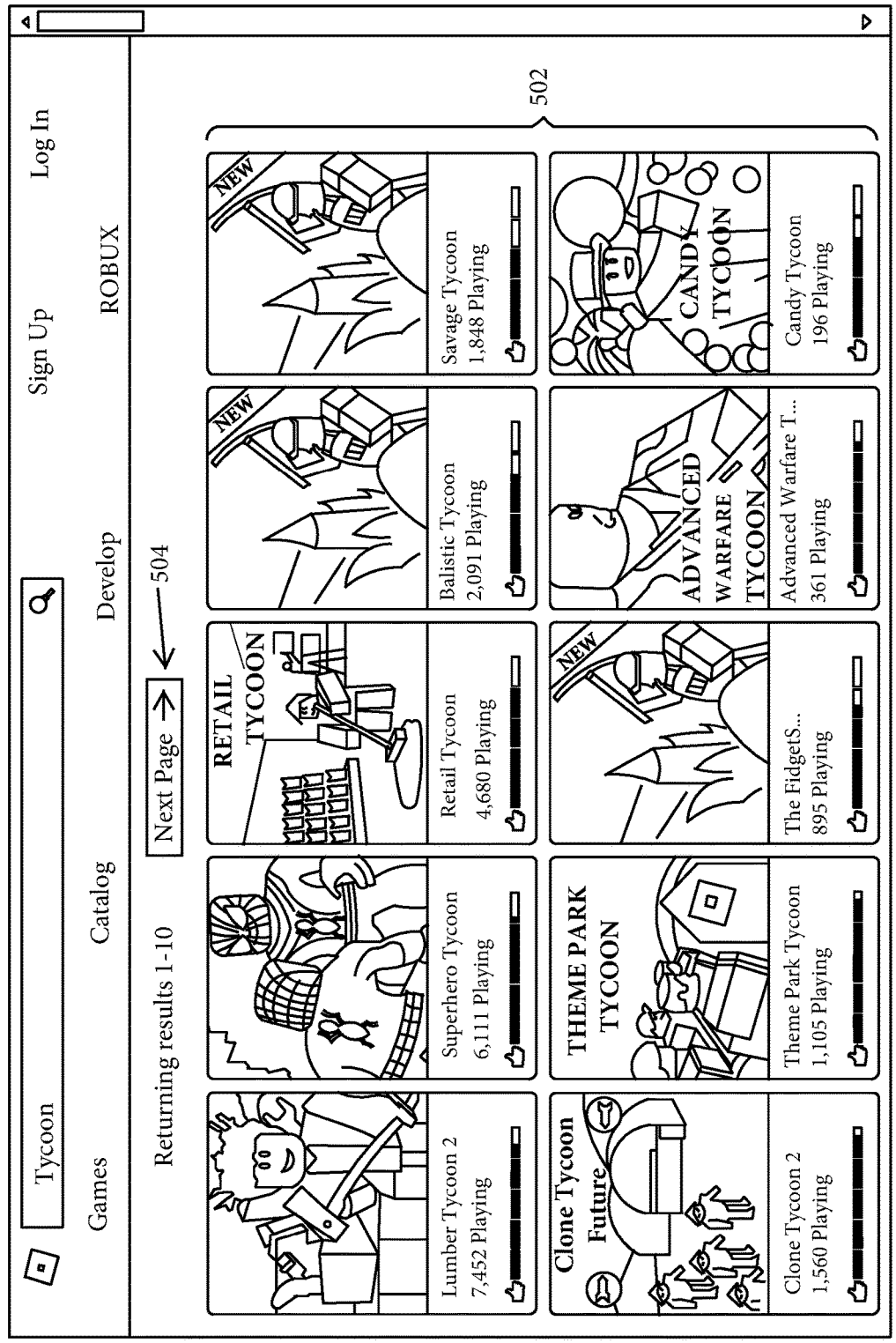
FIG. 5 is an example graphical user interface displaying search results in accordance with some implementations.

FIG. 5 is an example graphical user interface (GUI) 500 displaying search results 502 ordered according to historical data in accordance with some implementations. The GUI 500 includes a display of a first portion (e.g., page 1) of search results that have been matched with the search query "Tycoon" and ordered according to historical data (e.g., number of players playing). The GUI 500 includes an element 504 that, when selected, causes a request to retrieve a next set of results (e.g., page 2, etc.) to be sent. When the element 504 is selected, the system can send a request for the next set of results including an indication of what the next set is (e.g., page 2, etc.) and the search criterion being used (e.g., criterion one—historical or criterion two-recency).

Figure 6:
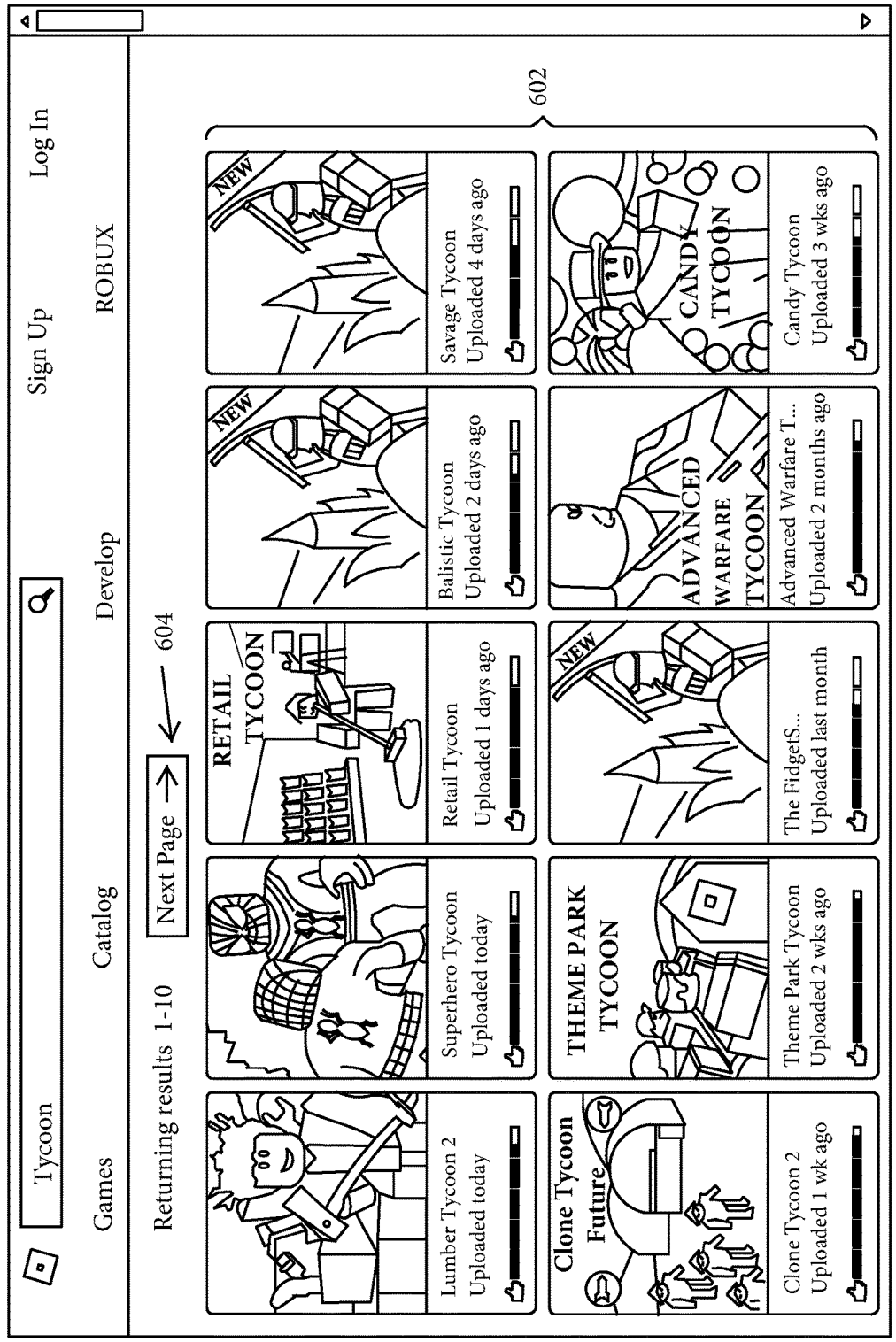
FIG. 6 is an example graphical user interface displaying search results in accordance with some implementations.

FIG. 6 is an example graphical user interface (GUI) 600 displaying search results 602 ordered according to recency in accordance with some implementations. The GUI 600 includes a display of a first portion (e.g., page 1) of search results that have been matched with a search query (e.g., "Tycoon) and ordered according to recency (e.g., in order of most recent upload to least recent upload). The GUI 600 includes an element 604, that when selected causes a request to retrieve a next set of results (e.g., page 2, etc.) to be sent. When the element 604 is selected, the system can send a request for the next set of results including an indication of what the next set is (e.g., page 2, etc.) and the search criterion being used (e.g., criterion one—historical or criterion two—recency).

One or more methods described herein (e.g., methods 200 and/or 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of improved discoverability in search, the computer-implemented method comprising:
   receiving, at a server, a search query from a device;
   selecting a search criterion from among a first criterion and a second criterion, wherein selecting the search criterion comprises:
      calculating a modulo result of: a hash of one or more search terms in the search query summed with a random value, the random value being selected from a total of N numbers and N is the divisor of the modulo calculation,
      comparing the modulo result to a search criterion selection threshold, wherein the search criterion threshold is an automatically adjustable search criterion threshold such that different proportional percentages of search queries are performed using respective first and second search criteria based on the automatically adjustable search criterion threshold,
      if the modulo result exceeds the automatically adjustable search criterion selection threshold, selecting the first criterion, and
      if the modulo result does not exceed the automatically adjustable search criterion selection threshold, selecting the second criterion;
   executing the search query against a data store using the selected search criterion;
   receiving search results from the data store in response to executing the search query; and
   transmitting at least a portion of the search results and a state indication corresponding to the search criterion to the device.

2. The computer-implemented method of claim 1, further comprising:
   receiving a request for additional results from the search results, wherein the request includes an indication of the additional results requested and the state indication; and
   providing additional search results according to the state indication.

3. The computer-implemented method of claim 1, wherein the data store includes one or more games and information associated with each game, wherein the information associated with each game includes one or more of game title, game type, game developer name, game first availability time, game most recent version availability time, or game popularity, and wherein executing the search query against a data store using the search criterion includes matching the search criterion against the information associated with each game.

4. The computer-implemented method of claim 3, wherein the search criterion selection threshold comprises at least two thresholds, and wherein the at least the two thresholds comprise a first threshold used for a first set of search terms and a global threshold used for search terms not in the first set of search terms.

5. The computer-implemented method of claim 1, wherein the search criterion is the first criterion and the search results comprise search results ranked by respective popularity of each search result.

6. The computer-implemented method of claim 1, wherein the search criterion is the second criterion, the method further comprising ranking the search results based on a recency associated with each item that matches the search query.

7. The computer-implemented method of claim 6, wherein the search results are determined based on the search query irrespective of the search criterion, and wherein the search criterion is used to determine an ordering of the search results.

8. The computer-implemented method of claim 1, wherein the search query includes a plurality of terms, and wherein selecting the search criterion is performed on a per search term basis, independent of search criterion selection made for other search terms.

9. The computer-implemented method of claim 1, wherein the different proportional percentages are based on one or more of: gaming platform user load, a time of day, a day of week, a date, user response to the portion of the search results, or periodic adjustment.

10. A non-transitory computer-readable medium having stored thereon software instructions that, when executed by a processor of a client device, cause the processor to perform operations comprising:
   receiving a search query;
   selecting a search criterion from among a first criterion and a second criterion, wherein selecting the search criterion comprises:
      calculating a modulo result of a hash of one or more search terms in the search query summed with a random value, the random value being selected from a total of N numbers and N is the divisor of the modulo calculation,
      comparing the modulo result to a search criterion selection threshold, wherein the search criterion threshold is an automatically adjustable search criterion threshold such that different proportional percentages of search queries are performed using respective first and second search criteria based on the automatically adjustable search criterion threshold,
      if the modulo result exceeds the automatically adjustable search criterion selection threshold, selecting the first criterion, and
      if the modulo result does not exceed the automatically adjustable search criterion selection threshold, selecting the second criterion;

transmitting the search query and the selected search criterion;
receiving search results from a data store in response to execution of the search query; and
storing a state indication corresponding to the search criterion.

11. The non-transitory computer-readable medium of claim 10, further comprising:
receiving a request for additional results from the search results, wherein the request includes an indication of the additional results requested and the state indication; and
providing additional search results according to the state indication.

12. The non-transitory computer-readable medium of claim 10, wherein the data store includes one or more games and information associated with each game, wherein the information associated with each game includes one or more of game title, game type, game developer name, game first availability time, game most recent version availability time, or game popularity, and wherein executing the search query against a data store using the search criterion includes matching the search criterion against the information associated with each game.

13. The non-transitory computer-readable medium of claim 12, wherein search criterion selection is based on a configurable threshold.

14. The non-transitory computer-readable medium of claim 12, wherein search criterion selection is based on a threshold that is configurable independently for one or more specific search terms.

15. The non-transitory computer-readable medium of claim 10, wherein the search criterion is the second criterion and the search results comprise search results ranked based on a recency associated with each item that corresponds to respective search results.

16. The non-transitory computer-readable medium of claim 15, wherein the search results are determined based on the search query irrespective of the search criterion, and wherein the search criterion is used to determine an ordering of the search results.

17. A system comprising:
one or more processors coupled to a non-transitory computer readable medium having stored thereon software instructions that, when executed by the one or more processors, cause the one or more processors to perform operations including:
receiving a search query at a server;
selecting a search criterion from among a first criterion and a second criterion, wherein
selecting the search criterion is based on evaluating a modulo result of a hash of one or more search terms in the search query summed with a random value, the random value being selected from a total of N numbers and N is the divisor of the modulo evaluation, wherein the evaluating includes comparing the modulo result to an automatically adjustable search criterion selection threshold, the comparison resulting in a first proportion of search being performed using the first criterion and a remaining proportion of searches being performed using the second criterion based on the automatically adjustable search criterion threshold;
executing the search query against a data store using the selected search criterion;
receiving search results from the data store in response to executing the search query;
transmitting a portion of the search results to a device from which the search query was received; and
transmitting a state indication corresponding to the search criterion to the device from which the search query was received.

18. The system of claim 17, further comprising:
receiving a request for additional results from the search results, wherein the request includes an indication of the additional results requested and the state indication; and
providing additional search results according to the state indication.

19. The system of claim 17, wherein the first criterion directs a search engine to return search results ranked by respective popularity of each query result.

20. The system of claim 17, wherein the second criterion directs a search engine to return search results ranked based on a recency associated with each item that corresponds to respective search results.

* * * * *